United States Patent [19]
Flint

[11] 3,876,235
[45] Apr. 8, 1975

[54] FAILURE LIMITING PIPE EXPANSION JOINT

[75] Inventor: Frederick A. Flint, McMurray, Pa.

[73] Assignee: The United States of America as represented by the U.S. Atomic Energy Commision, Washington, D.C.

[22] Filed: July 10, 1974

[21] Appl. No.: 487,326

[52] U.S. Cl. .................. 285/93; 285/286; 285/301
[51] Int. Cl. ............................................ F16l 55/00
[58] Field of Search .......... 285/286, 299, 301, 226, 285/93, 300, 114, 13, 14, 5; 61/12, 13; 277/53

[56] References Cited
UNITED STATES PATENTS

| 1,726,483 | 8/1929 | Giesler | 285/301 X |
| 2,406,234 | 8/1946 | Marancik et al. | 285/299 X |
| 2,713,503 | 7/1955 | Ekholm | 285/166 |
| 3,053,554 | 9/1962 | Magos et al. | 285/93 X |
| 3,068,026 | 12/1962 | McKamey | 285/300 X |
| 3,792,588 | 2/1974 | Gilaad | 285/14 X |

FOREIGN PATENTS OR APPLICATIONS
355,356  11/1960  United Kingdom................. 285/299

Primary Examiner—Richard J. Scanlan, Jr.
Assistant Examiner—Moshe I. Cohen
Attorney, Agent, or Firm—Dean E. Carlson; Kenneth L. Cage

[57] ABSTRACT

A failure limiting pipe expansion joint for fluid conduits comprises a bellows, single or multi-ply, welded into each pipe section, a ribbed inner sleeve welded to the pipe at one end of the expansion joint; an outer sleeve welded to the pipe at end opposite to which the inner sleeve is welded, a restraining collar affixed to the end of the outer sleeve opposite to the one welded to the pipe, a guide ring positioned between the inner sleeve and the pipe on the pipe end opposite of that to which the inner sleeve is welded, and a pressure tap extending through said outer sleeve. The inner and outer sleeves function together to guide the pipe ends as they move back and forth in response to pipe temperature changes.

9 Claims, 1 Drawing Figure

PATENTED APR 8 1975
3,876,235
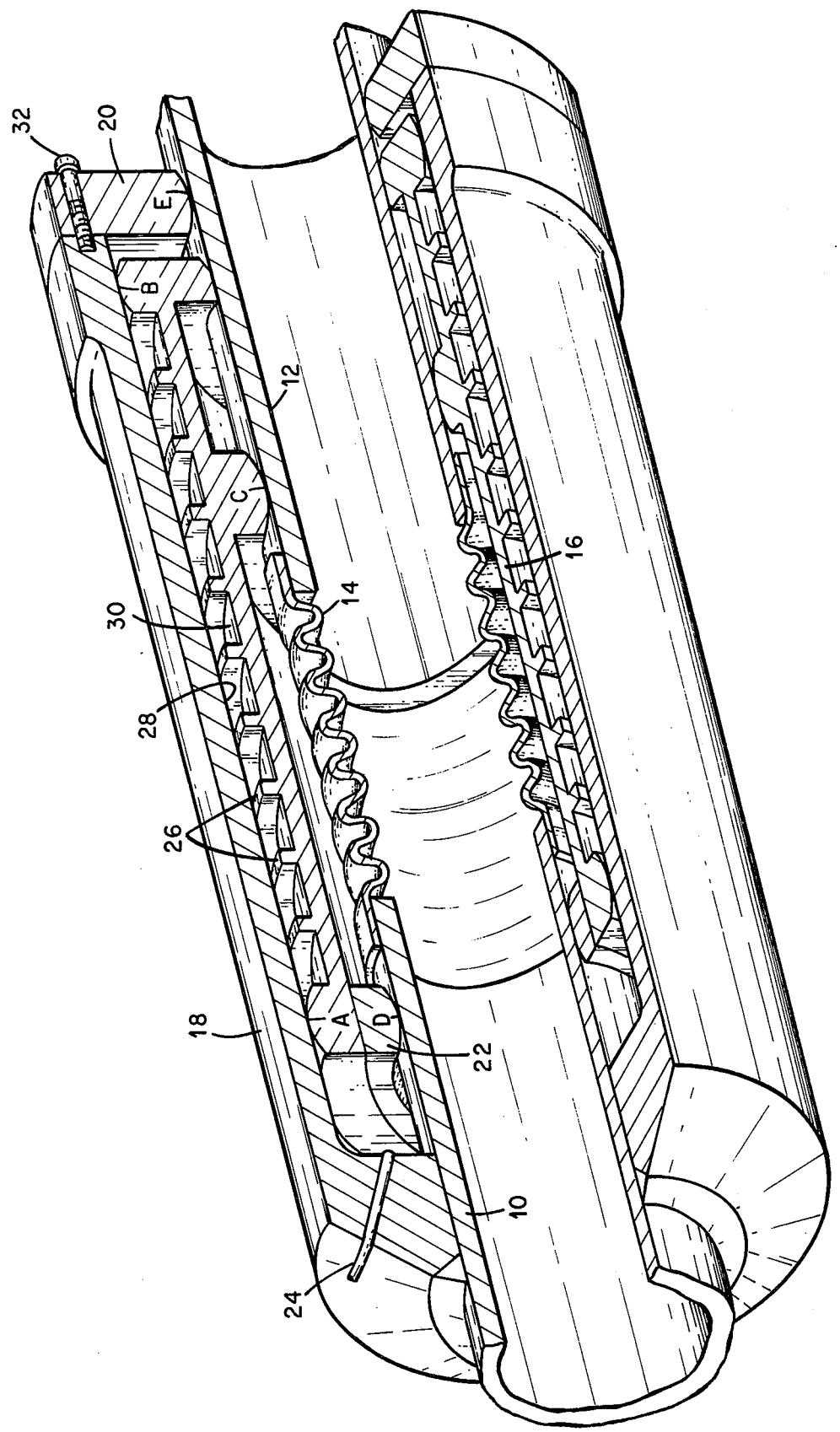

3,876,235

FAILURE LIMITING PIPE EXPANSION JOINT

BACKGROUND OF THE INVENTION

The invention described herein was made in the course of, or under, a contract with the United States Atomic Energy Commission.

1. Field of the Invention

This invention relates to expansion joints for conduits, pipe lines and the like, and concerns particularly expansion units for use in high pressure assemblies.

2. Description of the Prior Art

Expansion joints are used in piping systems to compensate for changes in pipe length due to piping temperature changes, particularly where spatial constraints preclude the use of expansion loops in the piping. Hence, pipe expansion joints are widely used in utilities piping of public and commercial buildings, such as school buildings, office buildings, hotels, and apartments as well as industrial process piping. Commercial pipe expansion joints in service today usually consist of a metal bellows welded into the piping wherever an expansion joint is needed. The bellows takes the place of a short section of pipe and flexes to compensate for changes of pipe length due to changes in pipe operating temperature. The bellows may be single ply or multiply and the pipe ends to which it is welded may or may not be guided or restrained, depending on the service requirements.

Typical prior art approaches on expansion joints which may be related to the present invention include U.S. Pat. No. 1,726,483 issued to J. B. Giesler on Aug. 27, 1929; U.S. Pat. No. 2,713,503 issued to C. R. Ekholm on July 19, 1955; and U.S. Pat. No. 3,053,554 issued to J. P. Magos et al. on Sept. 11, 1962. However, none of the prior art devices limit the discharge of the pipe contents upon rupture of a bellows seal or have sleeves so designed to preclude binding and galling between the inner and outer sleeves as in the manner of the present invention.

SUMMARY OF THE INVENTION

Therefore, it is an object of this invention to provide a failure limiting pipe expansion joint which limits the discharge of the pipe contents upon failure of metal bellows.

It is a further object of this invention to provide a pipe joint that in the event of a bellows failure lowers a liquid at high temperature and pressure to the saturation temperature of the liquid at atomspheric pressure.

A further object of the invention is to provide a means for calling attention to and locating the failure in the event of a bellows failure.

It is a further object of this invention to provide a concentric guiding system comprising inner and outer sleeves.

It is a further object of this invention to provide a pipe joint having greater resistance to bending at the bellows than that of the pipe.

A still further object is to provide a failure limiting pipe expansion joint having integral protection means to prevent damage to the bellows from external sources.

The present inventive failure limiting pipe expansion joint accomplishes the above objects and comprises a bellows welded into each of spaced apart pipe sections, a ribbed inner sleeve welded to the pipe at one end of the expansion joint, an outer sleeve welded to the pipe at the opposite end to which the inner sleeve is welded, a restraining collar affixed to the end of the outer sleeve opposite to the one welded to the pipe, and a guide ring positioned between the inner sleeve and pipe on the pipe end opposite of that to which the inner sleeve is welded whereby the inner and outer sleeves function together to guide the pipe ends as they move back and forth in response to pipe temperature changes.

BRIEF DESCRIPTION OF THE DRAWINGS

The FIGURE is a quarter section view of a perspective view of a pipe expansion joint incorporating the features of the present invention.

DESCRIPTION OF THE PREFERRED EMBODIMENT

Referring now to the drawing, the failure limiting pipe expansion joint 8, comprises a bellows 14, single or multi-ply, welded to spaced apart pipe sections 10 and 12, a ribbed inner sleeve 16 welded to the pipe at one end of the expansion joint, an outer sleeve 18 welded to the opposite end of the expansion joint, a restraining collar 20 affixed to the end of the outer sleeve opposite to the end welded to the pipe, a guide ring 22 positioned between the inner sleeve and pipe on the pipe end opposite of that to which the inner sleeve is fixed, and pressure tap 24 for an alarm signal extending through said outer sleeve.

The guide ring 22, inner sleeve 16 and outer sleeve 18 function together to guide and constrain the pipe ends 10 and 12 to axial motion as they move back and forth in response to pipe operating tmeperature changes. Specifically, the ribbed inner sleeve 16 includes at least two movable radially outwardly extending bearing surfaces A and B to engage the smooth inner surface of outer sleeve 18 and at least one movable radially inwardly extending bearing surface C to engage the pipe section to which the inner sleeve is welded thereto. The guide ring 22 provides a movable bearing surface D for sleeve 16 opposite to the welded end of the sleeve 16. Similarly, the restraining collar 20 provides a movable bearing surface E for sleeve 18 opposite to the welded end of sleeve 18. Surfaces A, B, and C on the inner sleeve, surface D on the guide ring 22 and surface E on the restraining collar 20 are rounded and smooth to ensure that the expansion joint will function without binding. The maximum diameter of surfaces A and B on the ribbed inner sleeve 16 is slightly greater than the diameter of sharp edged ribs 26 to preclude binding or galling of the ribs against the inner surface 28 of the outer sleeve 18. Other cross section shapes of the surfaces A–E include ovoid or eliptical surfaces.

An annular labyrinth flow restriction consisting of a series of sudden contractions and sudden expansions is formed between the ribbed inner sleeve 16 and the outer sleeve 18. With the pressure drop fixed by service conditions, the flow rate across the labyrinth flow restriction is determined by the number or ribs on the inner sleeve. In the event of a bellows 14 rupture, the labyrinth flow restriction will limit discharge of the pipe contents to a predetermined, by design, minimum, for a given set of service conditions, thereby reducing what could well be a disaster to a maintenance problem. In addition, in the case of liquids at high temperature and pressure, the discharge temperature will be lowered to the saturation temperature of the liquid at atomspheric pressure (i.e., in the case of water at 1,000 psia and 544°F, the discharge temperature would be 212°). This is accomplished by providing the required number of ribs 26 on the outer surface 30 of the inner sleeve 16 for the service conditions. The restraining collar 20, fixed to the free end of the outer sleeve 18, with cap screws 32 for ease of assembly, prevents the pipe ends from being forced apart by internal pressure in the event of complete circumferential failure of the bellows. The guide ring 22 fixed to the free end of the ribbed inner sleeve 16 by mechanical means, threads or pins, helps guide the pipe as it moves in or out in response to temperature changes. A pressure tap 24 in the outer sleeve actuates a pressure switch to sound an alarm and light an annunciator panel to pin point the location in the event of bellows 14 failure.

It is feasible to design and fabricate the failure limiting pipe expansion joint in standard pipe sizes and schedules as an off-the-shelf item with flange or weld end connections. The failure limiting pipe expansion joint could be fabricated from metals and alloys presently used in pipe and bellows fabrication such as carbon steel, stainless steel, monel, brass, etc. Fabrication of the failure limiting pipe expansion joint presents no special problems as the machining, welding, and forming involved are well within the limits of present day technology and state of the art.

The failure limiting pipe expansion joint has unlimited potential usage in hot water and steam heating systems in commercial and public buildings where personnel safety is of concern, such as school buildings, hotels, office buildings, and apartment buildings. Additionally, it has wide potential use in the piping systems of chemical and liquid processing industries where personnel safety and loss of valuable product, respectively, are of concern.

Thus it is apparent that there has been provided, in accordance with the invention, a failure limiting pipe expansion joint that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the claims.

I claim:

1. A failure limited pipe expansion joint for fluid conduits comprising spaced apart pipe sections; a bellows welded to said spaced apart piped sections; a ribbed inner sleeve welded to one of said pipe sections at one end of the expansion joint, said inner sleeve having radially outwardly extending bearing surfaces at each end, and at least one radially inwardly extending bearing surface; an outer sleeve welded to the other of said pipe sections, said outer sleeve having a smooth inner surface; a restraining collar affixed to the end of the outer sleeve opposite to the one welded to form a bearing surface; and a guide ring positioned between the inner sleeve and said other pipe section to form a bearing surface whereby said inwardly extending inner sleeve bearing surface and said guide ring bearing surface engage each respective pipe section, said outwardly extending inner sleeve surfaces engage said smooth inner surface of said outer sleeve, and said restraining collar bearing surface engages said one of said pipe sections.

2. The pipe joint defined in claim 1 including a pressure tap extending through said outer sleeve.

3. The pipe joint defined in claim 1 wherein said bellows comprises a single ply material.

4. The pipe joint defined in claim 1 wherein said bellows comprises a multi-ply material.

5. The joint defined in claim 1 wherein said bearing surfaces have an eliptical cross section.

6. The joint defined in claim 1 wherein said bearing surfaces have an ovoid cross section.

7. The joint defined in claim 1 wherein said ribbed inner sleeve had a plurality of outward projecting spaced apart ribs.

8. The joint defined in claim 1 wherein said guide ring is welded to said inner sleeve.

9. The joint defined in claim 1 wherein said guide ring is affixed by threads to said inner sleeve.

* * * * *